United States Patent
Park (10) Patent No.: US 11,300,740 B1
(45) Date of Patent: Apr. 12, 2022

(54) OPTICAL MODULE PACKAGE

(71) Applicant: OPROCESSOR INC, Boston, MA (US)

(72) Inventor: Sahnggi Park, Daejeon (KR)

(73) Assignee: OPROCESSOR INC, Boston, MA (US)

( * ) Notice: Subject to any disclaimer, the term of this patent is extended or adjusted under 35 U.S.C. 154(b) by 0 days.

(21) Appl. No.: 17/214,825

(22) Filed: Mar. 27, 2021

(30) Foreign Application Priority Data

Mar. 17, 2021 (KR) .................. 10-2021-0034548

(51) Int. Cl.
*H04B 10/00* (2013.01)
*G02B 6/42* (2006.01)

(52) U.S. Cl.
CPC ......... *G02B 6/4295* (2013.01); *G02B 6/4212* (2013.01); *G02B 6/4274* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,932,743 A * | 6/1990 | Isobe | ............. | G02B 6/34 385/36 |
| 6,987,906 B2 * | 1/2006 | Nakama | ............. | G02B 6/42 385/15 |
| 8,457,454 B1 * | 6/2013 | Roy | ............. | G02B 6/4279 385/33 |
| 8,546,955 B1 * | 10/2013 | Wu | ............. | H01L 23/5384 257/723 |
| 9,031,365 B2 * | 5/2015 | Park | ............. | H04B 10/27 385/36 |
| 9,331,096 B2 * | 5/2016 | Pinguet | ............. | G02F 1/2257 |
| 9,391,708 B2 * | 7/2016 | Fincato | ............. | H04B 10/801 |
| 9,423,567 B2 * | 8/2016 | Park | ............. | G02B 6/125 |

(Continued)

FOREIGN PATENT DOCUMENTS

WO   2016123115 A1   8/2016

OTHER PUBLICATIONS

"Intel® Core™ i7 Processor Family for the LGA2011-3 Socket: Thermal/Mechanical Specification and Design Guide (TMSDG)", Aug. 2014, Intel, pp. 1-57.

(Continued)

*Primary Examiner* — Agustin Bello
(74) *Attorney, Agent, or Firm* — Rabin & Berdo, P.C.

(57) ABSTRACT

An optical module package may include a package substrate, an interposer on the package substrate, and a first semiconductor chip and a second semiconductor chip on the interposer. The interposer may include a silicon substrate having a first surface, which is adjacent to the package substrate, and a second surface, which is opposite to the first surface and adjacent to the first and second semiconductor chips, a penetration electrode penetrating the silicon substrate, a lower interconnection layer disposed on the first surface of the silicon substrate, and an optical waveguide, a first optical module, and a second optical module disposed in a lower portion of the lower interconnection layer. The first optical module may include a light source providing light into the optical waveguide, and the second optical module may include a photodetector receiving the light.

16 Claims, 10 Drawing Sheets

(56) References Cited

U.S. PATENT DOCUMENTS

| | | | | |
|---|---|---|---|---|
| 9,496,248 | B2* | 11/2016 | Lee | H01L 25/0655 |
| 9,500,821 | B2* | 11/2016 | Hochberg | H01S 5/0261 |
| 9,671,572 | B2* | 6/2017 | Decker | G02B 6/428 |
| 9,748,167 | B1 | 8/2017 | Lin | |
| 9,874,688 | B2* | 1/2018 | Doerr | G02B 6/4269 |
| 10,012,792 | B2* | 7/2018 | Carpentier | G02B 6/12002 |
| 10,025,047 | B1* | 7/2018 | Liu | H05K 1/11 |
| 10,290,619 | B2* | 5/2019 | Evans | G02B 6/12004 |
| 10,761,262 | B2* | 9/2020 | Byrd | G02B 6/4266 |
| 10,873,399 | B2* | 12/2020 | Peterson | H01L 23/49827 |
| 10,877,217 | B2* | 12/2020 | Byrd | G02B 6/122 |
| 10,996,412 | B2* | 5/2021 | Perminjat | G02B 6/4274 |
| 11,043,478 | B2* | 6/2021 | Traverso | H01L 25/167 |
| 2009/0103855 | A1* | 4/2009 | Binkert | G02B 6/43 257/E21.598 |
| 2010/0006784 | A1* | 1/2010 | Mack | G02B 6/43 250/551 |
| 2010/0060972 | A1* | 3/2010 | Kucharski | G02F 1/2255 359/290 |
| 2010/0111473 | A1* | 5/2010 | Pinguet | G02B 6/34 385/37 |
| 2012/0177381 | A1* | 7/2012 | Dobbelaere | H01L 23/49866 398/139 |
| 2014/0241662 | A1* | 8/2014 | Park | G02B 6/34 385/14 |
| 2015/0010274 | A1* | 1/2015 | Park | G02B 6/34 385/36 |
| 2016/0085038 | A1* | 3/2016 | Decker | G02B 6/428 385/14 |
| 2016/0377823 | A1* | 12/2016 | Garland | G02B 6/4271 385/14 |
| 2017/0194310 | A1* | 7/2017 | Evans | H01L 31/02005 |
| 2018/0128998 | A1* | 5/2018 | Furuyama | G02B 6/4256 |
| 2018/0196196 | A1* | 7/2018 | Byrd | G02B 6/14 |
| 2018/0269164 | A1 | 9/2018 | Lin et al. | |
| 2018/0337111 | A1* | 11/2018 | Jou | G02B 6/1221 |
| 2019/0043808 | A1 | 2/2019 | Fontanelli et al. | |
| 2019/0230049 | A1 | 7/2019 | Clark et al. | |
| 2019/0265415 | A1* | 8/2019 | Psaila | G02B 6/12002 |
| 2019/0324201 | A1* | 10/2019 | Celo | G02B 6/122 |
| 2019/0391350 | A1 | 12/2019 | Evans et al. | |
| 2020/0116930 | A1* | 4/2020 | Kannan | G02B 6/12002 |
| 2020/0168552 | A1 | 5/2020 | Ha et al. | |
| 2021/0063653 | A1* | 3/2021 | Park | G02B 6/4215 |
| 2021/0214580 | A1* | 7/2021 | Park | G02B 6/4239 |
| 2021/0215897 | A1* | 7/2021 | Epitaux | G02B 6/43 |

OTHER PUBLICATIONS

Dana Vantrease et al., "Corona: System Implications of Emerging Nanophotonic Technology", ISCA, 2008, pp. 153-164.

Dylan Stow et al., "Cost and Thermal Analysis of High-Performance 2.5D and 3D Integrated Circuit Design Space", 2016 IEEE Computer Society Annual Symposium on VLSI, 2016, pp. 637-642.

George Kurian et al., "ATAC: A 1000-Core Cache-Coherent Processor with On-Chip Optical Network", 2010 19th International Conference on Parallel Architectures and Compilation Techniques (PACT), Sep. 11-15, 2010, pp. 477-488.

Meng-Jen Wang et al., "TSV Technology for 2.5D IC Solution", Electronic Components and Technology Conference Proceedings, May 2012, pp. 284-288.

Vern Solberg, "2.5D and 3D Semiconductor Package Technology: Evolution and Innovation", IPC APEX EXPO Proceedings. Presentation slides. 2016.

Vern Solberg, "2.5D and 3D Semiconductor Package Technology: Evolution and Innovation", IPC APEX EXPO Proceedings. 2016.

Sahnggi Park, "CPU Technology and Future Semiconductor Industry (III)", ETRI Electronics and Telecommunications Trends, 2020, pp. 120-136. Abstract in English.

* cited by examiner

OPTICAL MODULE PACKAGE

CROSS-REFERENCE TO RELATED APPLICATIONS

This U.S. non-provisional patent application claims priority under 35 U.S.C. § 119 to Korean Patent Application No. 10-2021-0034548, filed on Mar. 17, 2021, in the Korean Intellectual Property Office, the entire contents of which are hereby incorporated by reference.

BACKGROUND OF THE INVENTION

The present disclosure relates to an optical module package.

As electronic devices become smaller and faster, research is being conducted to increase the integration density of components in the electronic devices. In order to realize the smaller and faster electronic devices, it is necessary to reduce sizes of the components and to increase the signal transmission speed between the components.

An optical communication technology is one of technologies that have been developed to realize fast signal transmission between the components. In the case where the optical communication technology is applied to the electronic devices, it is possible to increase a signal transmission speed and reduce technical difficulties (e.g., high resistance, heating, and parasitic capacitance) in the conventional method.

In recent years, many studies have been actively conducted to utilize an optical fiber communication technology, which is in the matured stage, into computers. For example, in a silicon photonics technology, a silicon material is used as an optical waveguide for transmission of optical signals. In addition, research is also actively conducted to directly utilize the existing optical fiber communication technology for the computers (e.g., by inserting an optical fiber into the PCB board of the computer).

SUMMARY

An embodiment of the inventive concept provides an optical module package, which is configured to have a reduced power consumption property and an increased communication speed between semiconductor chips.

According to an embodiment of the inventive concept, an optical module package may include a package substrate, an interposer on the package substrate, and a first semiconductor chip and a second semiconductor chip on the interposer. The interposer may include a silicon substrate having a first surface, which is adjacent to the package substrate, and a second surface, which is opposite to the first surface and adjacent to the first and second semiconductor chips, a penetration electrode penetrating the silicon substrate, a lower interconnection layer disposed on the first surface of the silicon substrate, an optical waveguide disposed in a lower portion of the lower interconnection layer, and a first a first optical module, and a second optical module disposed on the optical waveguide. The first optical module may include a light source providing light into the optical waveguide, and the second optical module may include a photodetector receiving the light.

In an embodiment, the package substrate may include an upper portion, in which recesses are formed, and a portion of the first optical module and a portion of the second optical module may be disposed in the recesses, respectively.

In an embodiment, the optical module package may further include prisms, which are respectively provided between the light source and the optical waveguide and between the photodetector and the optical waveguide.

In an embodiment, the optical module package may further include buffer patterns, each of which is provided between a corresponding one of the prisms and the optical waveguide.

In an embodiment, the lower interconnection layer may include a metal pattern which is vertically separated from the optical waveguide, and the metal pattern may be electrically connected to the penetration electrode.

In an embodiment, the optical module package may further include a light-source driver-integrated circuit electrically connected to the first optical module and the metal pattern, and a photodetector driver-integrated circuit electrically connected to the second optical module and the metal pattern.

In an embodiment, the lower interconnection layer may further include a first insulating layer between the first surface of the silicon substrate and the optical waveguide and a second insulating layer between the optical waveguide and the metal pattern. The second insulating layer may cover a portion of the optical waveguide and may expose another portion of the optical waveguide, and the prism may be provided on the exposed portion of the optical waveguide.

In an embodiment, each of the light source and the photodetector may include a lens. The lens may include a plate-shaped base portion and a hemispherical protruding portion protruding from the base portion toward the prism.

In an embodiment, the optical module package may further include an upper interconnection layer provided between the semiconductor chips and the second surface of the silicon substrate. The upper interconnection layer may be electrically connected to the semiconductor chips and the penetration electrode.

In an embodiment, the optical waveguide may include one of silicon nitride, silicon oxynitride, and polyimide.

In an embodiment, the optical module package may further include a sub-package provided on the interposer. The sub-package may include a sub-package substrate, semiconductor chips on the sub-package substrate, and connection terminals between the sub-package substrate and the interposer.

According to an embodiment of the inventive concept, an optical module package may include a package substrate, an interposer on the package substrate, and a plurality of semiconductor chips on the interposer. The interposer may include a silicon substrate having a first surface, which is adjacent to the package substrate, and a second surface, which is opposite to the first surface and adjacent to the semiconductor chips, an optical device disposed on a lower portion of the interposer, a penetration electrode penetrating the silicon substrate, a lower clad layer disposed on the first surface of the silicon substrate, an optical waveguide on the lower clad layer, an upper clad layer disposed on the optical waveguide to expose a portion of the optical waveguide, and a metal pattern on the upper clad layer. The optical device may be provided on the expose portion of the optical waveguide.

In an embodiment, the optical device may include a light source and a photodetector. The optical module package may further include prisms, which are respectively provided between the light source and the optical waveguide and between the photodetector and the optical waveguide, and lenses, which are respectively provided between the light source and the prism and between the photodetector and the prism. The lens may include a material whose refractive index is higher than 1.65, and the optical waveguide may include silicon nitride whose refractive index ranges from 1.45 to 2.0.

In an embodiment, the package substrate may include an upper portion, in which a recess is formed. A portion of the optical device may be disposed in the recess.

In an embodiment, the optical module package may further include an upper interconnection layer provided between the semiconductor chips and the second surface of the silicon substrate. The upper interconnection layer may electrically connect the semiconductor chips to the penetration electrode.

According to an embodiment of the inventive concept, an optical module package may include a base substrate, a package substrate on the base substrate, a socket provided between the package substrate and the base substrate to enclose the package substrate, a semiconductor chip on the package substrate, a heat sink on the semiconductor chip, and a metal lid between the heat sink and the semiconductor chip. The semiconductor chip may include an optical waveguide which is disposed in a lower portion of an interconnection layer disposed in a lower portion thereof, and a first optical module, and a second optical module which are disposed on the optical waveguide. The first optical module may include a light source providing light into the optical waveguide, and the second optical module may include a photodetector receiving the light.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
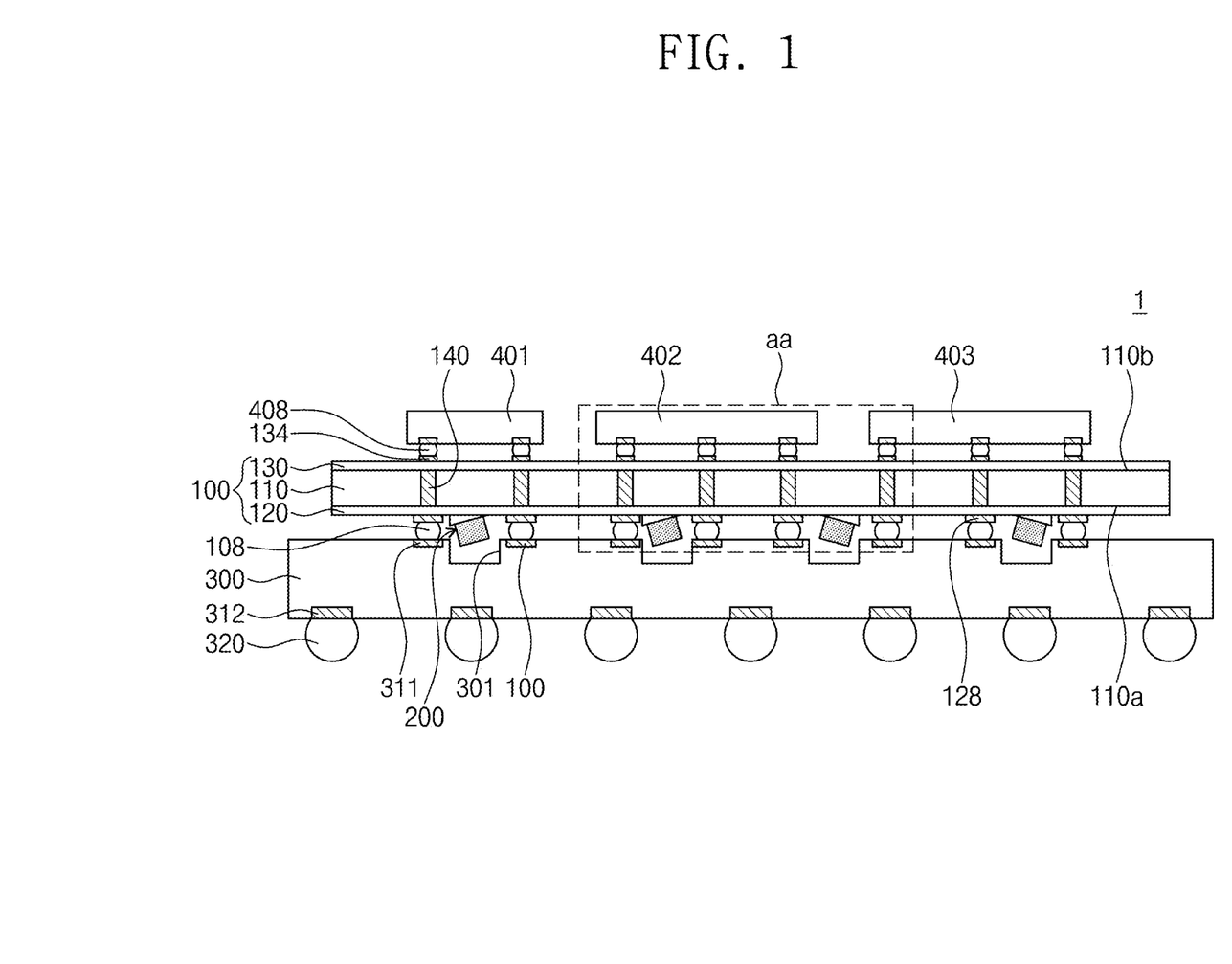
FIG. 1 is a sectional view schematically illustrating an optical module package according to an embodiment of the inventive concept.

FIG. 1 is a sectional view schematically illustrating an optical module package according to an embodiment of the inventive concept.

An optical module package 1 according to an embodiment of the inventive concept may include a package substrate 300, an interposer 100, and a plurality of semiconductor chips 401, 402, and 403.

In an embodiment, the package substrate 300 may be a printed circuit board (PCB). The package substrate 300 may include a first metal pad 311 and a second metal pad 312. The first metal pad 311 may be provided on a top surface of the package substrate 300, and the second metal pad 312 may be provided on a bottom surface of the package substrate 300. An outer coupling terminal 320 may be provided on the second metal pad 312, and the package substrate 300 may be connected to a motherboard through the outer coupling terminal 320. The outer coupling terminal 320 may include, for example, a solder ball. A plurality of recesses 301 may be provided in an upper portion of the package substrate 300.

The interposer 100 may be provided on the package substrate 300. The semiconductor chips 401, 402, and 403 may be provided on the interposer 100.

The interposer 100 may include a silicon substrate 110, a lower interconnection layer 120, an upper interconnection layer 130, a plurality of penetration electrodes 140, and an optical module 200.

The silicon substrate 110 may include a first surface 110a and a second surface 110b, which are opposite to each other. The first surface 110a of the silicon substrate 110 may be disposed adjacent to the package substrate 300. The second surface 110b of the silicon substrate 110 may be disposed adjacent to the semiconductor chips 401, 402, and 403.

The lower interconnection layer 120 may be disposed on the first surface 110a of the silicon substrate 110. The upper interconnection layer 130 may be disposed on the second surface 110b of the silicon substrate 110. A lower interconnection pad 128 may be provided on the lower interconnection layer 120. Lower connection terminals 108 may be provided between the lower interconnection pad 128 and the first metal pad 311. An upper interconnection pad 134 may be provided on the upper interconnection layer 130. Upper connection terminals 408 may be provided between the upper interconnection pad 134 and the semiconductor chips 401, 402, and 403.

Each of the penetration electrodes 140 may be provided to penetrate the silicon substrate 110. The optical module 200 may be disposed on a bottom surface of the lower interconnection layer 120. A portion of the optical module 200 may be disposed in the recess 301 of the package substrate 300. In detail, a light source or a photodetector, which will be described with reference to FIG. 3, may be disposed in the recess 301 of the package substrate 300.

Each of the semiconductor chips 401, 402, and 403 may be coupled to the interposer 100 in a flip-chip bonding manner or a wire bonding manner. Each of the semiconductor chips 401, 402, and 403 may be a logic chip or a memory chip. The logic chip may include one of a central processing unit (CPU), a graphics processing unit (GPU), a system-on-a-chip (SoC), and so forth, and the memory chip may include one of a dynamic random-access memory (DRAM), a static random-access memory (SRAM), and so forth.

Figure 2:
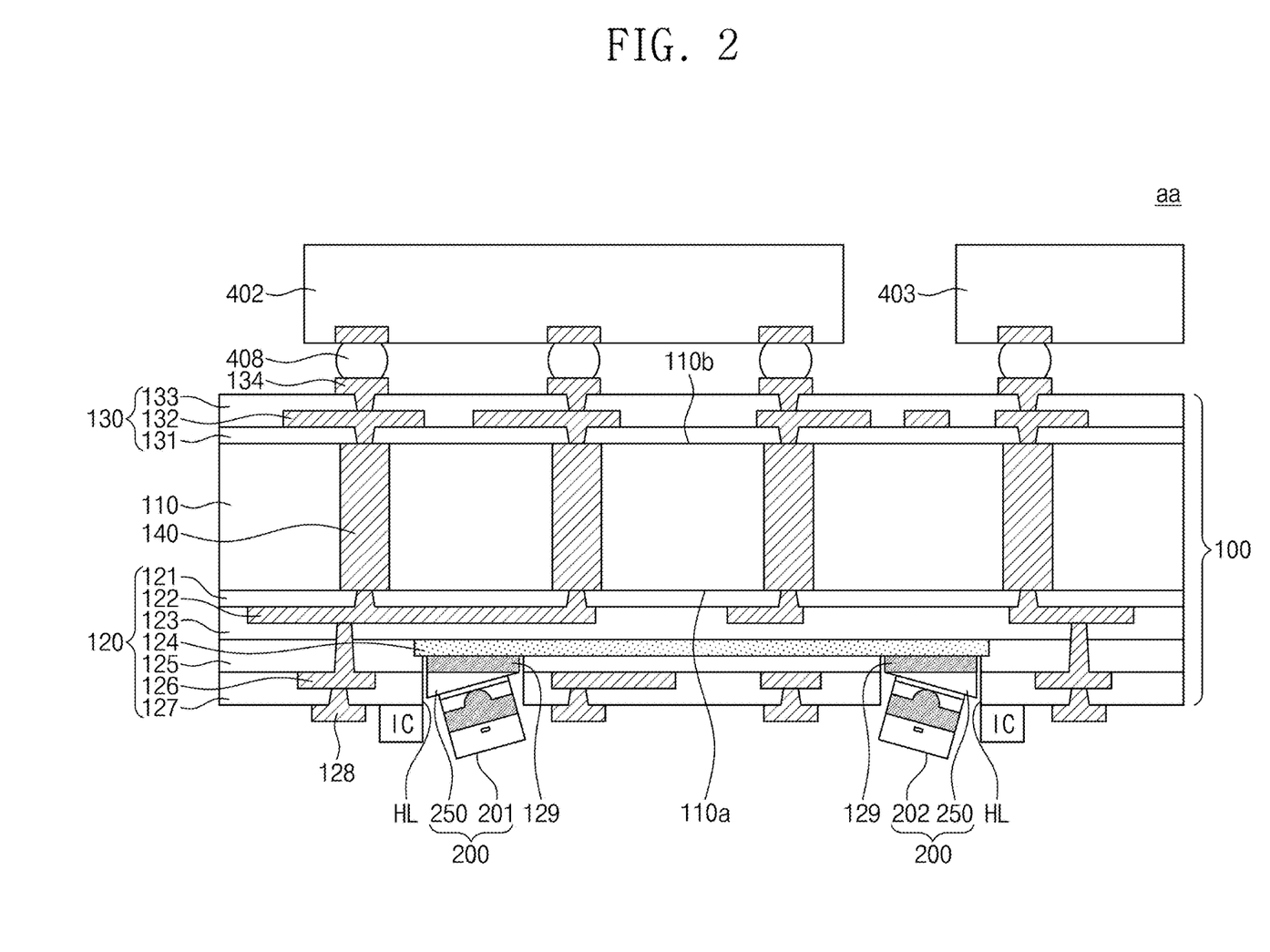
FIG. 2 is an enlarged sectional view of a portion 'aa' of FIG. 1.

FIG. 2 is an enlarged sectional view of a portion 'aa' of FIG. 1. In order to reduce complexity in the drawings and to provide better understanding of the inventive concept, some elements of the optical module package may be omitted.

Referring to FIGS. 1 and 2, the lower interconnection layer 120 may include a first lower insulating layer 121, a first lower metal pattern 122, a second lower insulating layer 123, an optical waveguide 124, a third lower insulating layer 125, a second lower metal pattern 126, and a fourth lower insulating layer 127, which are sequentially stacked on the first surface 110a of the silicon substrate 110.

The first to fourth lower insulating layers 121, 123, 125, and 127 may be formed of or include silicon oxide ($SiO_2$). In an embodiment, the second lower insulating layer 123 may be formed of or include silicon oxynitride (SiON).

The first and second lower metal pattern 122 and 126 and the lower interconnection pad 128 may be formed of or include, for example, copper. The optical waveguide 124 may be formed of or include silicon nitride whose refractive index ranges from 1.45 to 2.9. The optical waveguide 124 may be formed of or include at least one of silicon nitride (SiN), silicon oxynitride (SiON), or polyimides. In the case where the second lower insulating layer 123 includes silicon oxynitride (SiON), the optical waveguide 124 may be formed of or include silicon nitride (SiN). Each of the first and second lower metal pattern 122 and 126 may include a via portion and a line portion. The via portion of the first lower metal pattern 122 may penetrate the first lower insulating layer 121 and may be connected to the penetration electrode 140. The via portion of the second lower metal pattern 126 may penetrate the second lower insulating layer 123 and the third lower insulating layer 125 and may be connected to the first lower metal pattern 122.

The first and second lower metal pattern 122 and 126 may not be in contact with the optical waveguide 124. A portion of the first lower metal pattern 122 and/or a portion of the second lower metal pattern 126 may be vertically spaced apart from each other. A portion of the first lower metal pattern 122 and/or a portion of the second lower metal pattern 126 may be vertically overlapped with the optical waveguide 124. The optical waveguide 124 may be disposed at a level that is different from the line portion of the first lower metal pattern 122 and the line portion of the second lower metal pattern 126, and in this case, it may be possible to increase a degree of freedom in disposing and designing them. The lower interconnection pad 128 may penetrate the fourth lower insulating layer 127 and may be connected to the second lower metal pattern 126. Holes HL may be provided to penetrate the fourth lower insulating layer 127 and the third lower insulating layer 125 and to expose portions of the optical waveguide 124. The optical module 200 may be provided on the exposed portion of the optical waveguide 124.

The optical module 200 may include optical devices 201 and 202 and a prism 250. As an example, one optical waveguide 124 may have two portions, which are exposed through a pair of the holes HL. The optical modules 200 may be provided on the two exposed portions, respectively, of the optical waveguide 124. The optical module 200 will be described in more detail below.

The upper interconnection layer 130 may include a first upper insulating layer 131, an upper metal pattern 132, and a second upper insulating layer 133, which are sequentially stacked on the second surface 110b of the silicon substrate 110. The first and second upper insulating layers 131 and 133 may be formed of or include, for example, silicon oxide. The upper metal pattern 132 and the upper interconnection pad 134 may be formed of or include, for example, copper. The upper metal pattern 132 may include a via portion and a line portion, and the via portion may penetrate the first upper insulating layer 131 and may be in contact with the penetration electrode 140. The upper interconnection pad 134 may penetrate the second upper insulating layer 133 and may be connected to the upper metal pattern 132.

Referring to the optical module 200 and the optical waveguide 124, one of the optical modules 200 may include a light source 201, and another one of the optical modules 200 may include a photodetector 202. Each of the light source 201 and the photodetector 202 may correspond to an optical device. The light source 201 may include a vertical-cavity surface-emitting laser (VCSEL) or a laser diode. The photodetector 202 may include a photodiode. The light source 201 and the photodetector 202 may be connected to each other through the optical waveguide 124. The light source 201, the optical waveguide 124, and the photodetector 202 may form an optical signal transmission path.

A buffer pattern 129 may be provided between each optical module 200 and the optical waveguide 124. The buffer pattern 129 may cover the exposed portion of the optical waveguide 124.

A driver-integrated circuit IC may be provided on the fourth lower insulating layer 127. The driver-integrated circuit IC may be disposed adjacent to the optical module 200. The driver-integrated circuit IC may be electrically connected to the optical module 200. In an embodiment, the driver-integrated circuit IC may be connected to at least one of the first and second lower metal patterns 122 and 126 and may be electrically connected to the penetration electrode 140 therethrough.

The driver-integrated circuit IC may include a light-source driver-integrated circuit and a photodetector driver-integrated circuit. The light-source driver-integrated circuit may be electrically connected to the light source 201, and the photodetector driver-integrated circuit may be electrically connected to the photodetector 202.

As an example, an electrical signal may be transmitted from a first semiconductor chip 402 to the driver-integrated circuit IC through the penetration electrode 140. In the driver-integrated circuit IC, the electrical signal may be converted into an optical signal by the light source 201. Such an optical signal may be transmitted to the photodetector 202 through the optical waveguide 124.

The photodetector 202 may convert an optical signal to an electrical signal, and the converted electrical signal may be transmitted to a second semiconductor chip 403 through the photodetector driver-integrated circuit and the penetration electrode 140. That is, according to an embodiment of the inventive concept, the semiconductor chips 402 and 403 may be connected to each other through the optical waveguide 124 and the optical module 200.

In an embodiment, semiconductor devices (e.g., a trans-impedance amplifier (TIA) and a transistor) may be connected to at least one of the first and second lower metal patterns 122 and 126 and may be electrically connected to the penetration electrode 140 therethrough.

Figure 3:
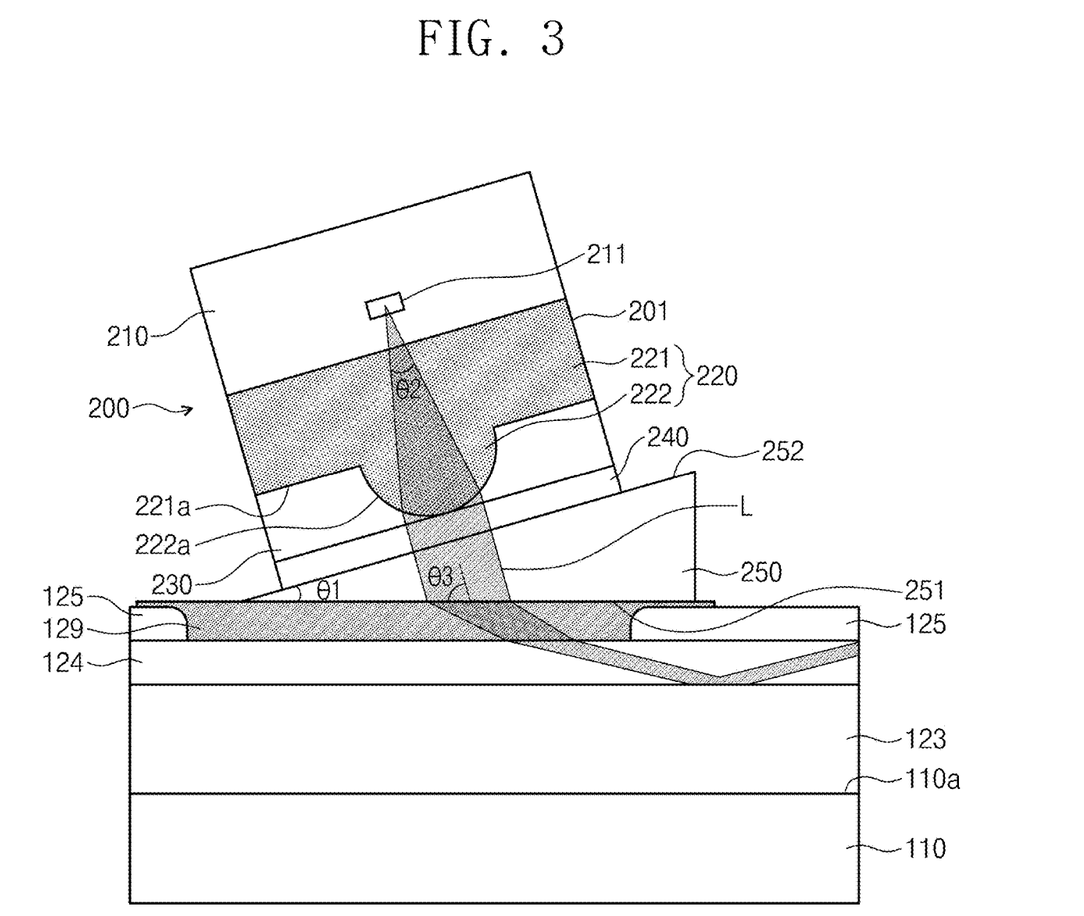
FIG. 3 is a conceptual diagram illustrating an optical module of FIG. 2 and a light propagation process therein.

FIG. 3 is a conceptual diagram illustrating the optical module of FIG. 2 and a light propagation process therein. In order to reduce complexity in the drawings and to provide better understanding of the inventive concept, some elements in FIG. 2 may be omitted from FIG. 3.

Referring to FIG. 3, the second lower insulating layer 123 may be referred to as a lower clad layer 123. The lower clad layer 123 may have a lower refractive index than the optical waveguide 124. The third lower insulating layer 125 may be referred to as an upper clad layer 125.

A top surface of the optical waveguide 124 may include a first portion and a second portion. The upper clad layer 125 may be provided to cover the first portion of the top surface of the optical waveguide 124 and to expose the second portion. A refractive index of the upper clad layer 125 may be lower than the refractive index of the optical waveguide 124.

The buffer pattern 129 may cover the second portion of the top surface of the optical waveguide 124. In other words, the buffer pattern 129 may be provided to cover a portion of the top surface of the optical waveguide 124 exposed by the upper clad layer 125. The buffer pattern 129 may have a higher refractive index than the optical waveguide 124.

The prism 250 may be disposed on the buffer pattern 129. A bottom surface 251 of the prism 250 may be in contact with the buffer pattern 129. The buffer pattern 129 may be used to prevent the air from entering into a region between the prism 250 and the optical waveguide 124 and to adhesively fix the prism 250. The prism 250 may be provided to have a section that is shaped like a right-angled triangle with an inclined surface 252. In an embodiment, a wavelength division multiplexing (WDM) filter may be provided between the prism 250 and the buffer pattern 129. The WDM filter may be configured to concentrate a laser light L to the optical waveguide 124.

An inclination angle of the prism 250 may be defined as a first angle θ1. The prism 250 may be formed of or include crystalline silicon or gallium phosphide (GaP). A refractive index of the prism 250 may be higher than the refractive index of the optical waveguide 124.

An optical device may be in contact with the inclined surface 252 of the prism 250. For example, the optical device may be the light source 201. The light source 201 may include a light generation part 210, a lens 220, an adhesive layer 230, and a light transmission part 240. In an embodiment, the photodetector 202 may be provided in place of the light source 201.

The light generation part 210 may be configured to generate and emit the laser light L. The light generation part 210 may be a vertical-cavity surface-emitting laser (VS-CEL) device or a laser diode. A radiation angle of the laser light L, which is emitted from the light generation part 210, may be a second angle θ2. In an embodiment, the second angle θ2 may range from 20° to 40°. The light generation part 210 may include an opening 211, and the laser light L may be emitted through the opening 211.

The lens 220 may be provided on the light generation part 210. The lens 220 may be configured to convert the light, which is emitted from the light generation part 210, to a collimated beam. In the case where the optical device is the photodetector 202, the lens 220 may be configured to focus the light, which is emitted from the optical waveguide 124, on a detector.

The lens 220 may include a base portion 221 and a protruding portion 222. The base portion 221 may be a plate-shaped element. The protruding portion 222 may have a hemispherical shape. The base portion 221 may be provided on the light generation part 210, and the protruding portion 222 may be an element that is extended from the base portion 221 toward the prism 250. The protruding portion 222 may have a radius that is smaller than 100 µm. The lens 220 may be formed of or include at least one of SiC, GaN, TiN, $LiNbO_3$, $TiO_2$, ZnSe, or polyimides. The refractive index (n) of the lens 220 may be higher than 1.65.

The adhesive layer 230 may be provided on the lens 220. The adhesive layer 230 may cover the lens 220. For example, the adhesive layer 230 may cover a top surface 221a of the base portion 221 of the lens 220 and a top surface 222a of the protruding portion 222 of the lens 220. The adhesive layer 230 may be formed of or include an adhesive agent for optical devices.

The light transmission part 240 may be provided on the adhesive layer 230. The light transmission part 240 may be formed of or include glass or quartz. The light transmission part 240 is illustrated to be in contact with the protruding portion 222 of the lens 220, but the inventive concept is not limited to this example. In other words, the light transmission part 240 may be spaced apart from the protruding portion 222 of the lens 220 by the adhesive layer 230.

Referring to an operation of the optical module according to an embodiment of the inventive concept, the laser light L, which is generated by the light generation part 210 of the light source 201, may pass through the prism 250 and the buffer pattern 129. When the laser light L passes through the lens 220 and the adhesive layer 230, the radiation angle of the laser light L may be decreased. For example, the laser light L passing through the light transmission part 240 may have a radiation angle of 0°.

The laser light L passing through the light transmission part 240 may be incident into the inclined surface 252 of the prism 250 in a direction normal to the inclined surface 252 and may pass through the prism 250. The laser light L passing through the prism 250 may be incident into the bottom surface 251 of the prism 250 at a third angle θ3. The third angle θ3 may be given depending on the inclination angle of the prism 250. For example, a sum of the first and third angles θ1 and θ3 may be 90°.

The laser light L passing through the prism 250 may be incident into the optical waveguide 124 through the buffer pattern 129. The laser light L, which is incident into the optical waveguide 124, may be reflected by the lower clad layer 123 and the upper clad layer 125 and may propagate along the optical waveguide 124.

FIGS. 4A to 4D are sectional views illustrating a method of fabricating an optical module package, according to an embodiment of the inventive concept.

Figure 4A:
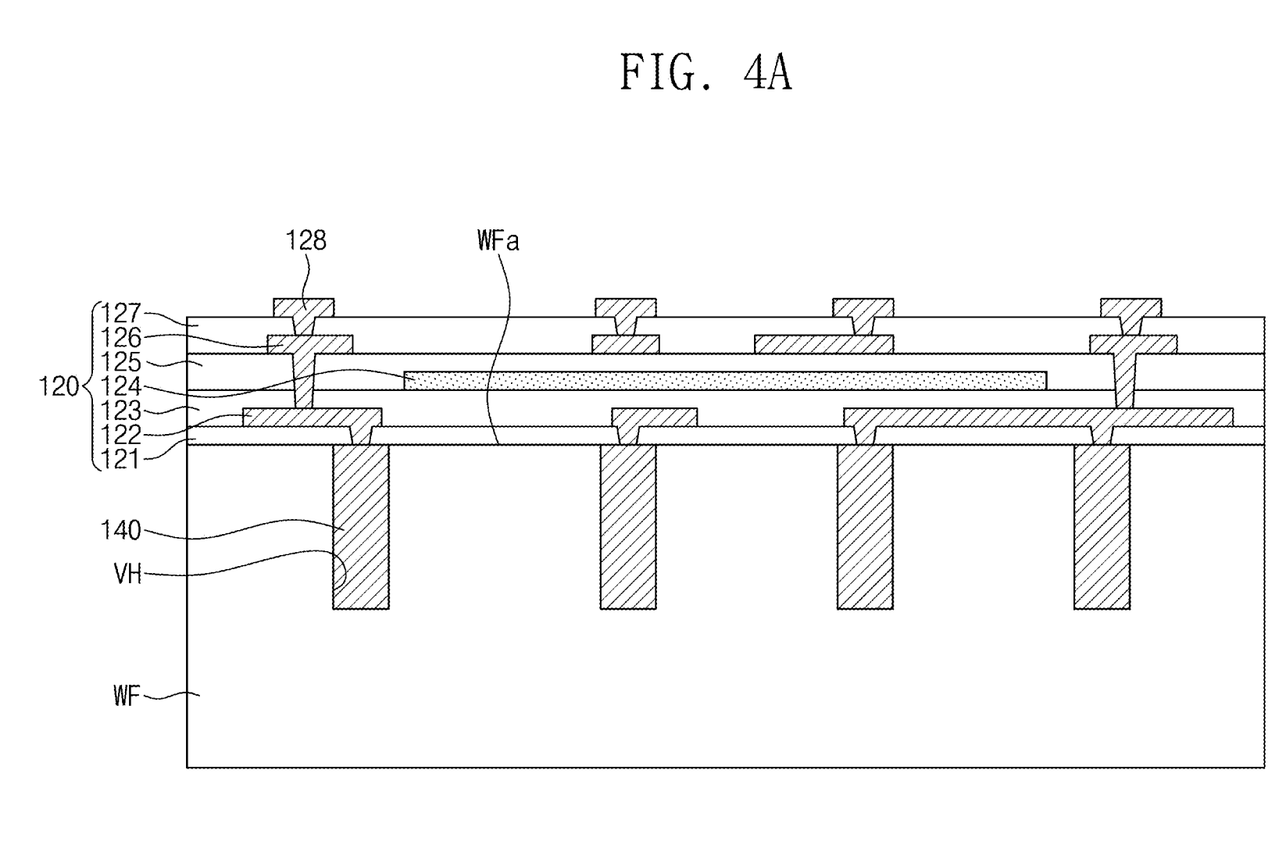
FIGS. 4A to 4D are sectional views illustrating a method of fabricating an optical module package, according to an embodiment of the inventive concept.

Referring to FIG. 4A, a wafer WF may be provided. The wafer WF may be formed of or include silicon. Via holes VH, which are vertically extended from a first surface WFa of the wafer WF, may be formed to penetrate a portion of the wafer WF. A depth of the via hole VH may range from about 100 µm to about 200 µm. A seed/barrier layer may be formed in the via hole VH. The penetration electrode 140 may be formed by an electroplating process, in which the seed/barrier layer is used as a plating electrode.

The lower interconnection layer 120 may be formed on the first surface WFa of the wafer WF. The formation of lower interconnection layer 120 may include sequentially forming the first lower insulating layer 121, the first lower metal pattern 122, the second lower insulating layer 123, the optical waveguide 124, the third lower insulating layer 125, the second lower metal pattern 126, the fourth lower insulating layer 127, and the lower interconnection pad 128. The first to fourth lower insulating layers 121, 123, 125, and 127 and the optical waveguide 124 may be formed through, for example, a chemical vapor deposition (CVD) method and a patterning process. The patterning process may include, for example, an etching process.

Figure 4B:
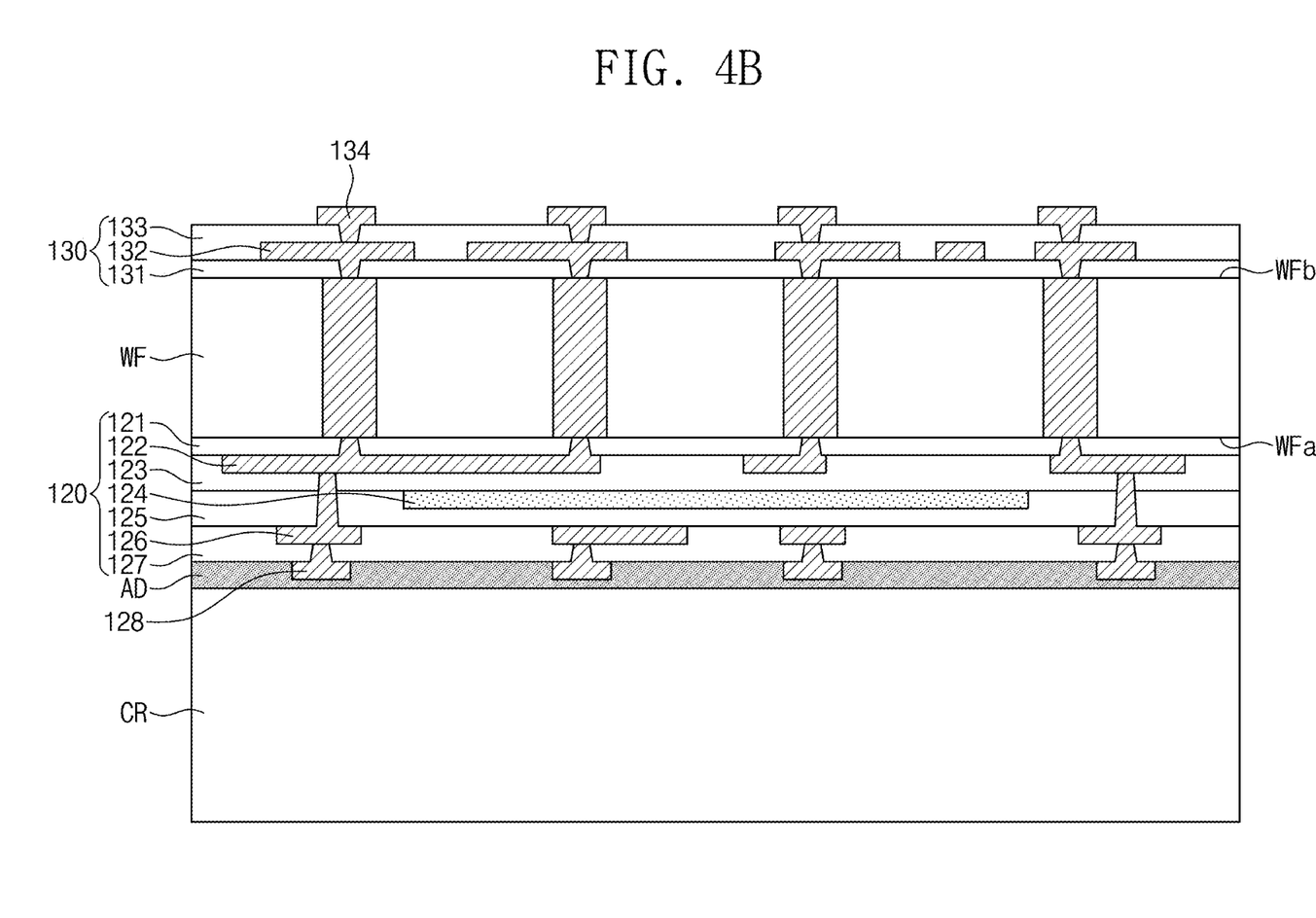

Referring to FIG. 4B, the wafer WF of FIG. 4A may be vertically inverted and may be attached to a carrier substrate CR. An adhesive layer AD may be provided between the carrier substrate CR and the lower interconnection layer 120 to fasten the wafer WF. In an embodiment, a grinding process may be performed on a surface of the wafer WF, which is opposite to the first surface WFa, to thin the wafer WF. The grinding process may be performed until the penetration electrode 140 is exposed to the outside. After the grinding process, the wafer WF may have a thickness of about 100-200 µm.

Hereinafter, the ground surface of the wafer WF, which is opposite to the first surface WFa, will be referred to as a second surface WFb. The upper interconnection layer 130 may be formed on the second surface WFb of the wafer WF. For example, the formation of the upper interconnection layer 130 may include sequentially forming the first upper insulating layer 131, the upper metal pattern 132, the second upper insulating layer 133, and the upper interconnection pad 134. In an embodiment, the upper interconnection layer 130 may be formed by substantially the same method as that for the lower interconnection layer 120.

Figure 4C:
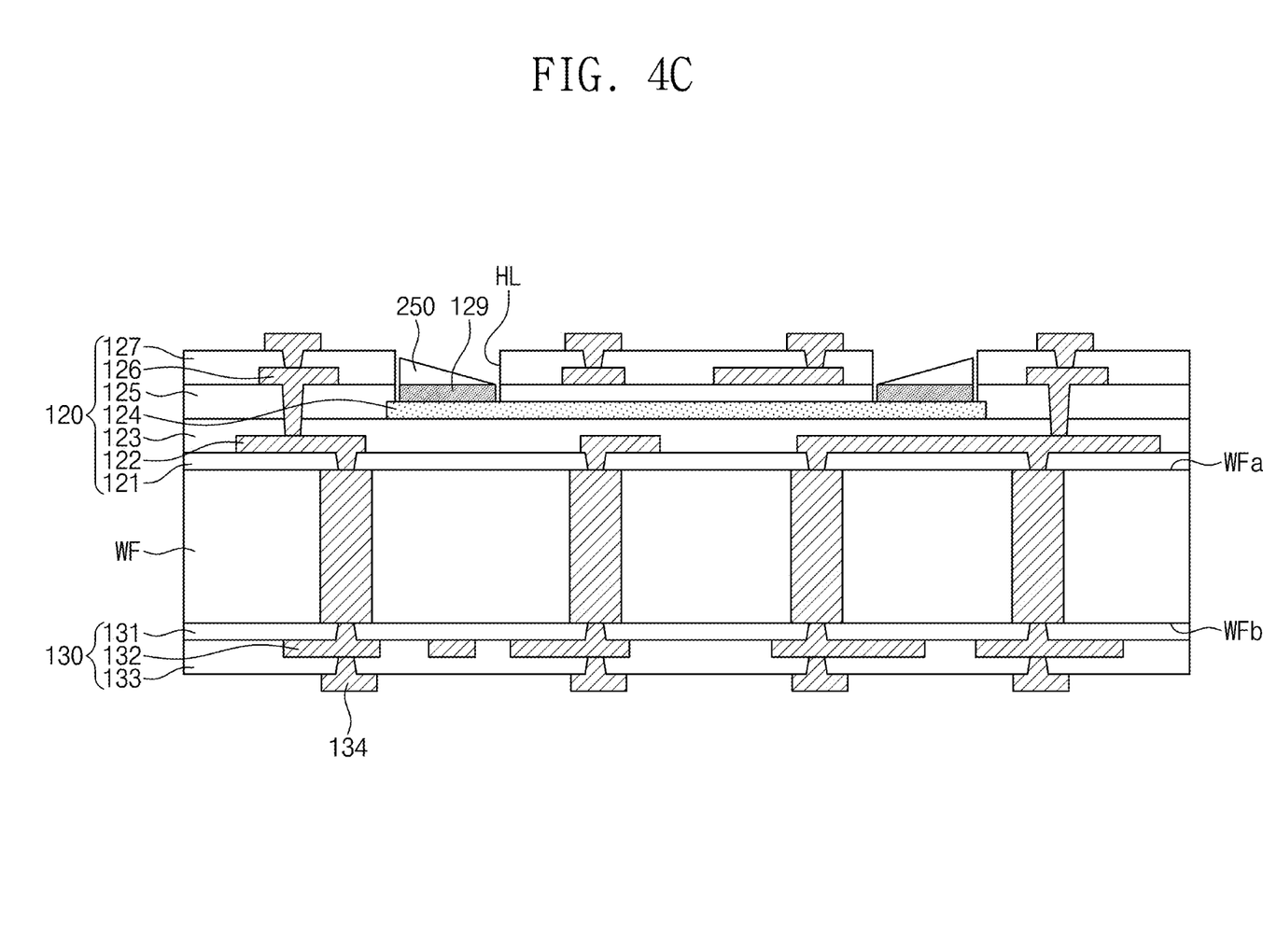

Referring to FIG. 4C, the wafer WF may be detached from the carrier substrate CR, and then, the adhesive layer AD may be removed. The wafer WF of FIG. 4B may be vertically inverted, and then, the holes HL may be formed in the lower interconnection layer 120. The formation of the holes HL may include, for example, an etching process. The holes HL may be formed to expose a portion of the top surface of the optical waveguide 124. The buffer pattern 129 may be formed on the exposed portion of the top surface of the optical waveguide 124, and then, the prism 250 may be attached to the buffer pattern 129. The buffer pattern 129 may serve as an adhesive layer.

Figure 4D:
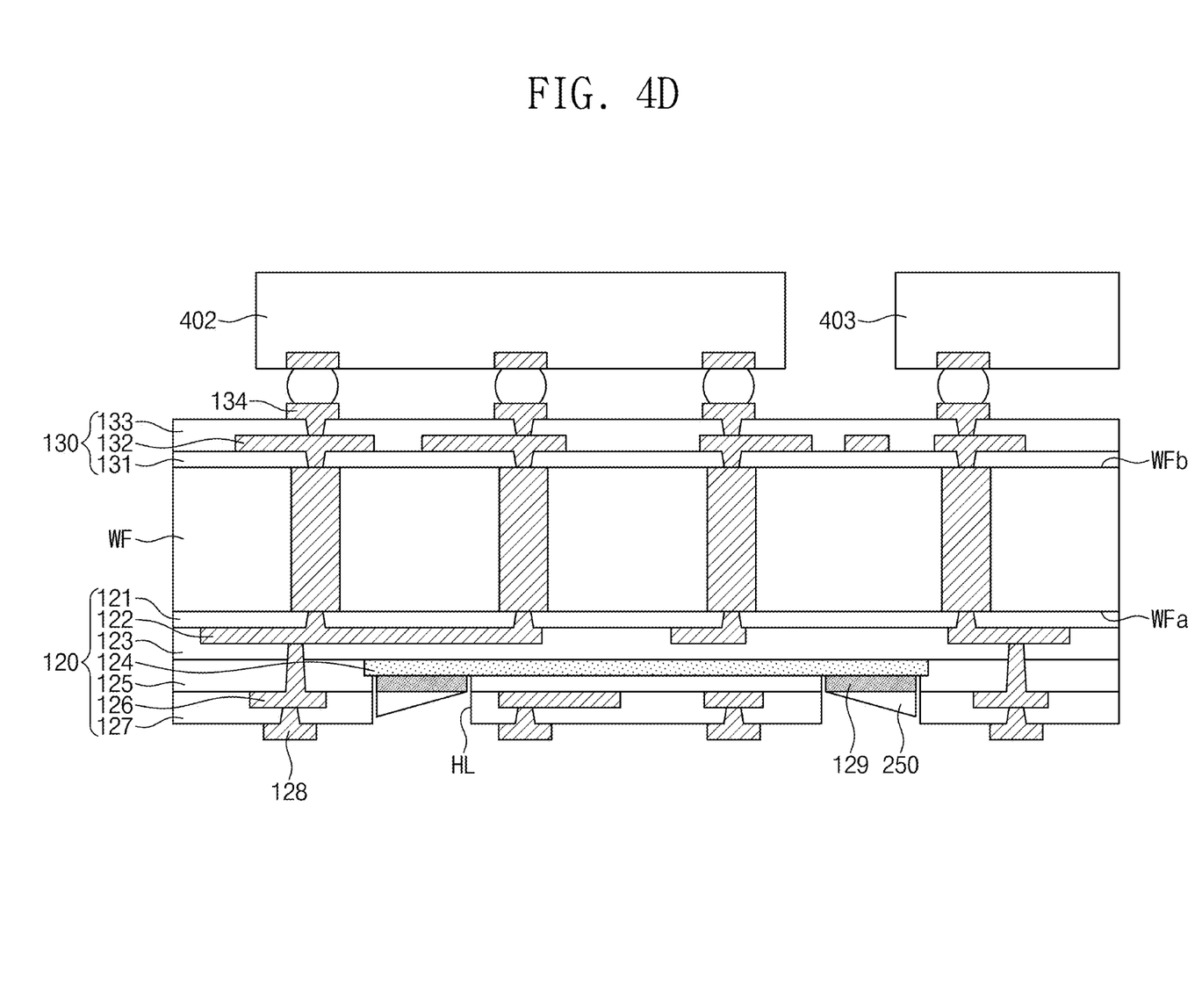

Referring to FIG. 4D, the wafer WF of FIG. 4C may be vertically inverted, and then the semiconductor chips 402 and 403 may be mounted on the upper interconnection layer 130. For example, the semiconductor chips 402 and 403 may be mounted in a flip-chip manner.

Referring back to FIG. 2, the wafer WF of FIG. 4D may be vertically inverted, and then, the optical devices 201 and 202 may be attached to the prism 250. As a result, the optical module 200 may be formed. Thereafter, the driver-integrated circuit IC, the lower connection terminal 108, or the like may be attached to the lower interconnection layer 120.

A plurality of interposers 100 may be formed by performing a sawing process on the wafer WF. Each of the interposers 100 may be provided on the package substrate 300 with the recesses 301, as shown in FIG. 1.

Figure 5:
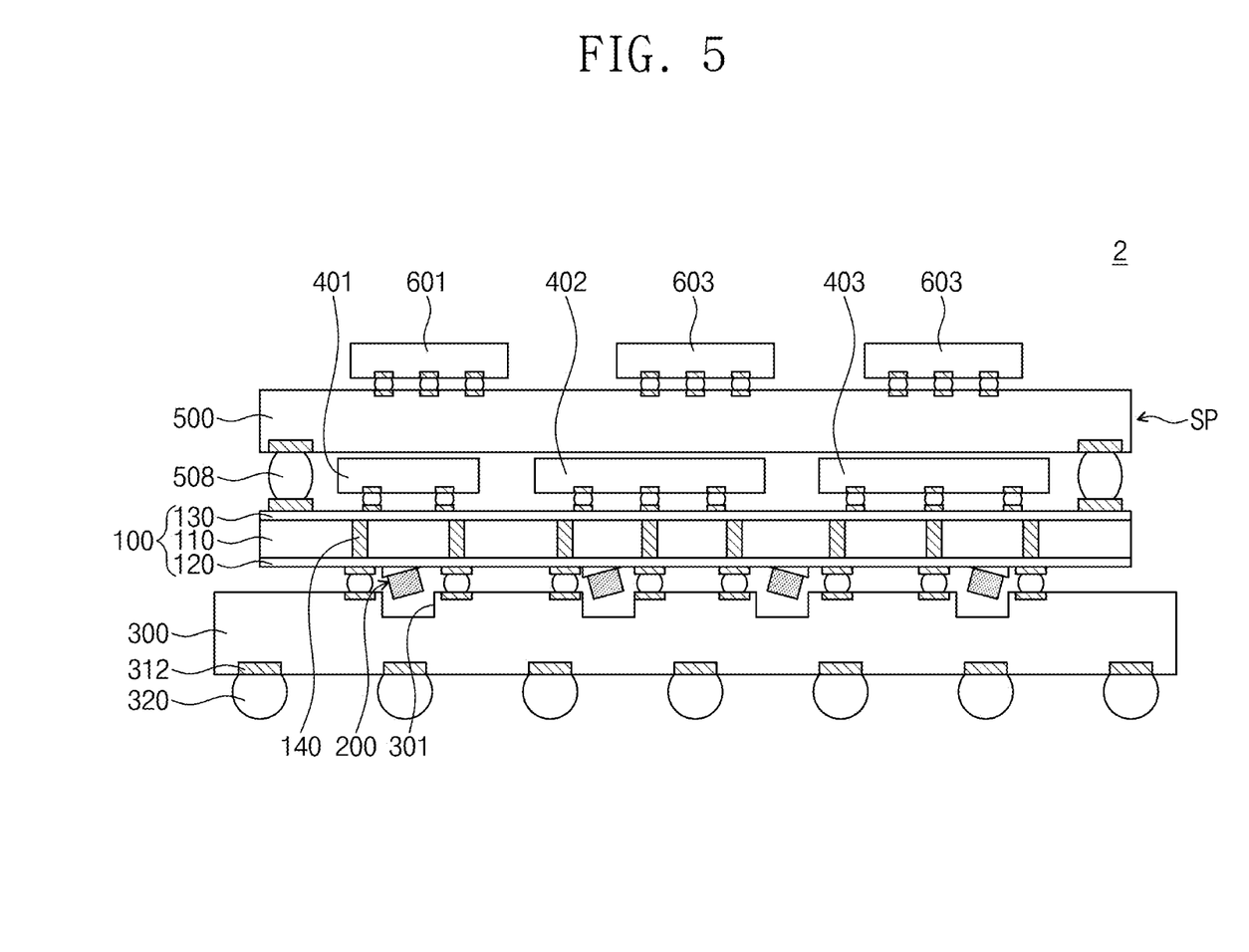
FIG. 5 is a sectional view illustrating an optical module package according to an embodiment of the inventive concept.

FIG. 5 is a sectional view illustrating an optical module package according to an embodiment of the inventive concept. For concise description, an element previously described with reference to FIGS. 1 to 3 may be identified by the same reference number without repeating an overlapping description thereof.

Referring to FIG. 5, an optical module package 2 according to an embodiment of the inventive concept may further include a sub-semiconductor package SP on the interposer 100. In other words, the optical module package 2 may have a package-on-package structure.

The sub-semiconductor package SP may include a sub-package substrate 500, upper semiconductor chips 601, 602, and 603, and a package connection terminal 508. The sub-semiconductor package SP may include a printed circuit board (PCB) or a redistribution substrate. The sub-package substrate 500 and the interposer 100 may be connected to each other through the package connection terminal 508. The package connection terminal 508 may include a solder ball, a pillar, and so forth. The upper semiconductor chips 601, 602, and 603 may be connected to the sub-package substrate 500 in a flip-chip or wire bonding manner. The semiconductor chips 401, 402, and 403 disposed on the interposer 100 may be referred to as lower semiconductor chips. The upper semiconductor chips 601, 602, and 603 may be configured to have functions different from the lower semiconductor chips 401, 402, and 403. As an example, the lower semiconductor chips 401, 402, and 403 may be logic chips, and the upper semiconductor chips 601, 602, and 603 may be memory chips.

According to an embodiment of the inventive concept, an optical communication process through the optical waveguide 124 and the optical module 200 may be used for signal transmission in high speed chips, such as the logic chips 401, 402, and 403. Low speed chips, such as the memory chips 601, 602, and 603, may be mounted on an additional substrate (e.g., the sub-package substrate 500), and a metal line may be used for transmission of electrical signals in the low speed chips.

Figure 6:
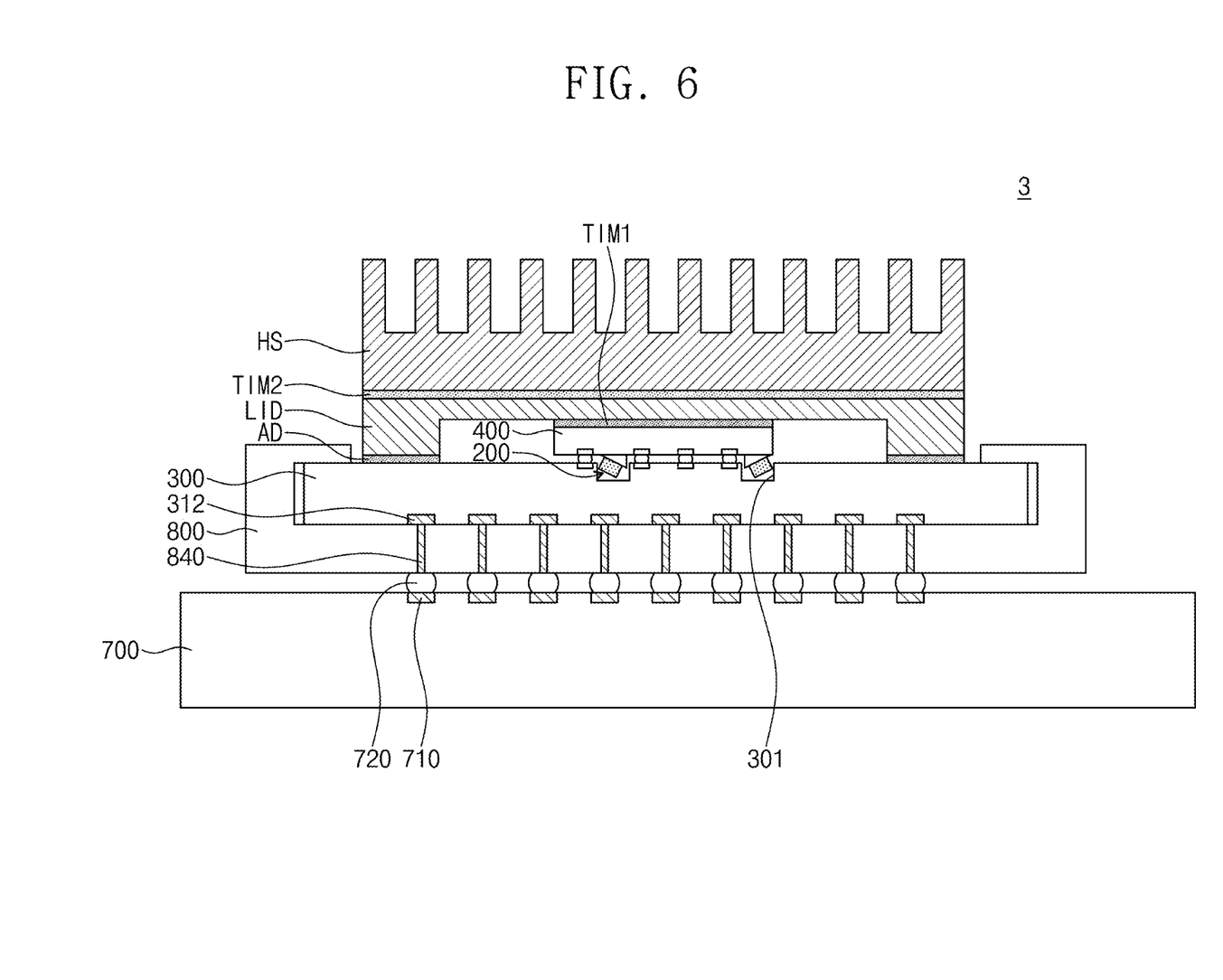
FIG. 6 is a sectional view illustrating an optical module package according to an embodiment of the inventive concept.

FIG. 6 is a sectional view illustrating an optical module package according to an embodiment of the inventive concept.

Referring to FIG. 6, an optical module package 3 according to an embodiment of the inventive concept may include a motherboard 700, a socket 800, the package substrate 300, a lid LID, and a heat sink HS.

The interposer 100 described above may be omitted from the optical module package 3. Instead, the optical module 200 and an optical waveguide in a semiconductor chip 400 may be provided in the optical module package 3. The semiconductor chip 400 may be, for example, a central processing unit (CPU). The semiconductor chip 400 may include a plurality of cores, which are connected to the optical waveguide and the optical module 200. The optical waveguide and the optical module 200 may be disposed in substantially the same manner as those of FIGS. 1 to 3.

The motherboard 700 may be, for example, a printed circuit board (PCB). The motherboard 700 may be referred to as a base substrate. The socket 800 may include a metal pin 840. An outer connection terminal 720 may be provided between the socket 800 and the motherboard 700. The socket 800 may be connected to the motherboard 700 through the metal pin 840 and the outer connection terminal 720. The socket 800 may be mounted on the motherboard 700 by a surface mount technology (SMT) process.

The package substrate 300 may be provided on the socket 800. An upper portion of the socket 800 may have a non-flat structure and may be in contact with the top surface of the package substrate 300. The upper portion of the socket 800 may be configured to exert a physical force on the top surface of the package substrate 300, and the package substrate 300 may be fastened by the physical force. For example, the socket 800 may be one of clamps or one of assemblies, which are realized using independent loading mechanism (ILM). The metal pin 840 of the socket 800 may be in contact with the first metal pad 311 of the package substrate 300.

The package substrate 300 may include an upper portion, in which the recesses 301 are formed. A portion of the optical module 200, which is located below the semiconductor chip 400, may be provided in a corresponding one of the recesses 301.

The semiconductor chip 400 and the lid LID may be provided on the package substrate 300. The lid LID may be formed of or include, for example, a metallic material. The adhesive layer AD may be provided between and attached to the lid LID and the package substrate 300. The lid LID may be provided to enclose the semiconductor chip 400, and heat produced in the semiconductor chip 400 may be transferred to the lid LID through a first thermal interface layer TIM1. The heat sink HS may be provided on the lid LID. A second thermal interface layer TIM2 may be provided between the heat sink HS and the lid LID. In an embodiment, a cooling fan (not shown) may be further provided on the heat sink HS.

Figure 7:
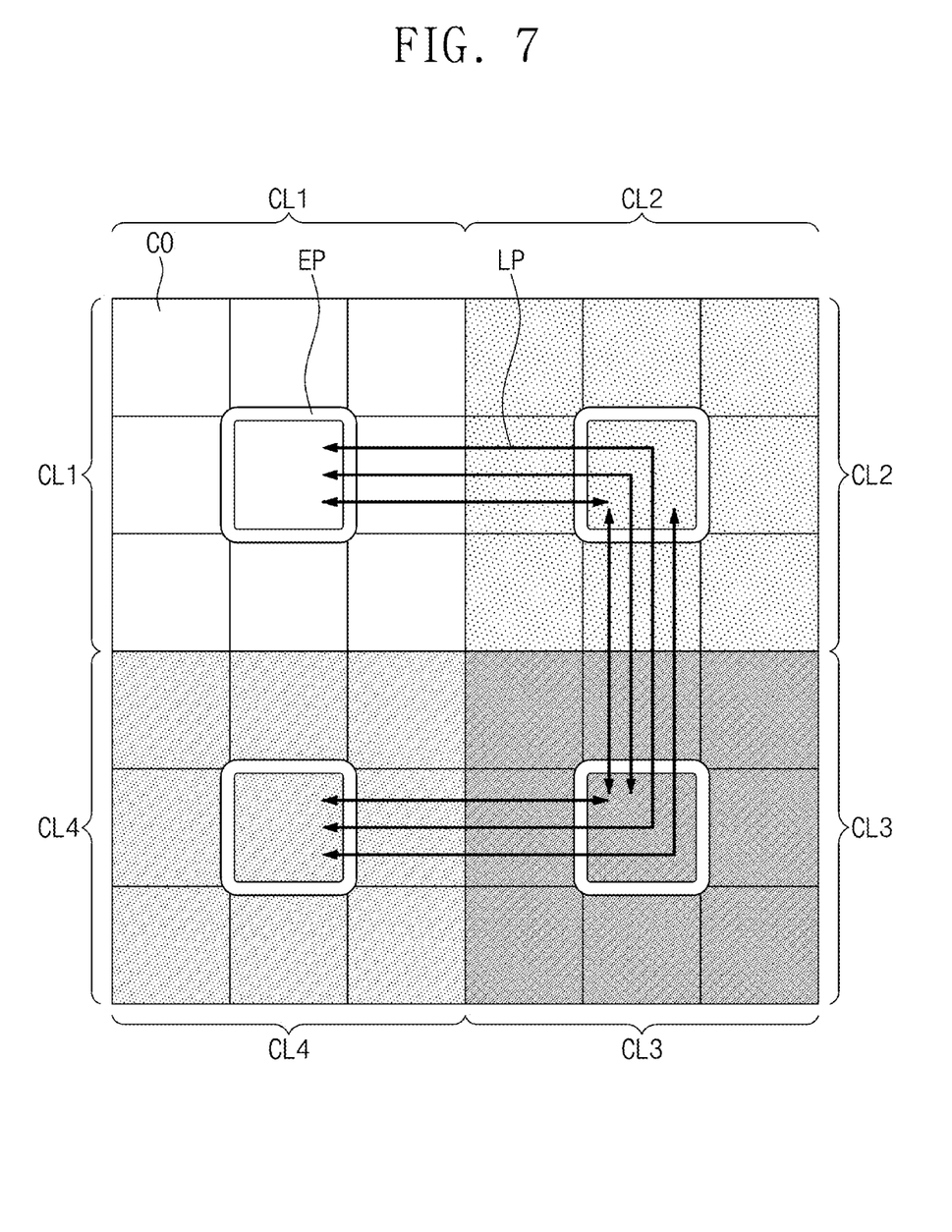
FIG. 7 is a conceptual diagram illustrating a structure of an optical communication network.

FIG. 7 is a conceptual diagram illustrating a structure of an optical communication network.

As an example, four semiconductor chips may be provided on the interposer 100 of FIG. 1. Each of the four semiconductor chips may include nine cores CO. The nine cores CO may be configured to exchange data by a ring-shaped electric communication structure EP including metal patterns.

The nine cores CO may constitute each of clusters CL1, CL2, CL3, and CL4. The four clusters CL1, CL2, CL3, and CL4 may include a first cluster CL1, a second cluster CL2, a third cluster CL3, and a fourth cluster CL4, which will be arranged in a clockwise direction.

The optical communication network may be configured in such a way that one of the clusters (e.g., CL1) has optical communication lines LP which are coupled to the remaining ones of the clusters (e.g., CL2, CL3, and CL4) in a one-to-one manner. As an example, the first cluster CL1 may be directly connected to the second cluster CL2, the third cluster CL3, and the fourth cluster CL4 through the optical communication lines LP. Thus, the one of the clusters (e.g., CL1) may receive data, which are sent from the remaining ones of the clusters (e.g., CL2, CL3, and CL4), at the same time. In this case, a process of transmitting data from the second to fourth clusters CL2, CL3, and CL4 to the first cluster CL1 may be executed without any restriction on transmission order or without any transmission waiting issue.

As an example, each of the optical communication lines LP may require ten light sources and ten photodetectors. In the case where each of the clusters CL1, CL2, CL3, and CL4 includes three optical communication lines LP, 60 areas may be required for the optical devices (e.g., the light sources and the photodetectors). Thus, the four clusters may require totally 240 areas for the optical devices. The area for the optical device may correspond to the area for the prism.

According to an embodiment of the inventive concept, a semiconductor chip may be disposed on the interposer 100, and an optical device may be disposed below the interposer. In this case, it may be possible to secure a sufficient space for the formation of the optical communication network and to increase a degree of freedom in designing an optical waveguide.

In addition, according to an embodiment of the inventive concept, communication between the cores may be achieved through an optical communication method, not by an electrical communication method. In this case, it may be possible to reduce power consumption by 120 times and to increase a communication speed by 14 times or more. In detail, when a total sum of communication speeds on six optical communication lines LP shown in FIG. 7 was 3.072 Tb/s, values of power consumption required for the same communication speed were 30 W and 0.25 W for the electrical and optical communication methods, respectively. With regard to the communication speed, latency of 5120 cycles was required in the electric communication method, whereas latency of 369 cycles was required in the optical communication method.

In an optical module package according to an embodiment of the inventive concept, an optical module and an optical waveguide may be provided in a lower portion of an interposer. As a result, it may be possible to reduce power consumption of the optical module package and to increase a communication speed between semiconductor chips on the interposer.

While example embodiments of the inventive concept have been particularly shown and described, it will be understood by one of ordinary skill in the art that variations in form and detail may be made therein without departing from the spirit and scope of the attached claims.

What is claimed is:

1. An optical module package, comprising:
    a package substrate;
    an interposer on the package substrate; and
    a first semiconductor chip and a second semiconductor chip on the interposer,
    wherein the interposer comprises:
    a silicon substrate having a first surface, which is adjacent to the package substrate, and a second surface, which is opposite to the first surface and adjacent to the first and second semiconductor chips;
    a penetration electrode penetrating the silicon substrate;
    a lower interconnection layer disposed on the first surface of the silicon substrate;
    an optical waveguide disposed in a lower portion of the lower interconnection layer; and
    a first optical module, and a second optical module disposed on the optical waveguide,
    wherein the first optical module comprises a light source providing light into the optical waveguide, and the second optical module comprises a photodetector receiving the light.

2. The optical module package of claim 1, wherein the package substrate comprises an upper portion, in which recesses are formed, and
    a portion of the first optical module and a portion of the second optical module are disposed in the recesses, respectively.

3. The optical module package of claim 1, further comprising prisms, which are respectively provided between the light source and the optical waveguide and between the photodetector and the optical waveguide.

4. The optical module package of claim 3, further comprising buffer patterns, each of which is provided between a corresponding one of the prisms and the optical waveguide.

5. The optical module package of claim 3, wherein the lower interconnection layer comprises a metal pattern which is vertically separated from the optical waveguide, and
    the metal pattern is electrically connected to the penetration electrode.

6. The optical module package of claim 5, further comprising:
    a light-source driver-integrated circuit electrically connected to the first optical module and the metal pattern; and
    a photodetector driver-integrated circuit electrically connected to the second optical module and the metal pattern.

7. The optical module package of claim 5, wherein the lower interconnection layer further comprises:
    a first insulating layer between the first surface of the silicon substrate and the optical waveguide; and
    a second insulating layer between the optical waveguide and the metal pattern,
    wherein the second insulating layer covers a portion of the optical waveguide and exposes another portion of the optical waveguide, and
    the prism is provided on the exposed portion of the optical waveguide.

8. The optical module package of claim 5, wherein each of the light source and the photodetector comprises a lens, and
    the lens comprises:
    a plate-shaped base portion; and
    a hemispherical protruding portion protruding from the base portion toward the prism.

9. The optical module package of claim 1, further comprising an upper interconnection layer provided between the semiconductor chips and the second surface of the silicon substrate,
    wherein the upper interconnection layer is electrically connected to the semiconductor chips and the penetration electrode.

10. The optical module package of claim 1, wherein the optical waveguide comprises one of silicon nitride, silicon oxynitride, and polyimide.

11. The optical module package of claim 1, further comprising a sub-package provided on the interposer,
    wherein the sub-package comprises:
    a sub-package substrate;
    semiconductor chips on the sub-package substrate; and
    connection terminals between the sub-package substrate and the interposer.

12. An optical module package, comprising:
    a package substrate;
    an interposer on the package substrate; and
    a plurality of semiconductor chips on the interposer,
    wherein the interposer comprises:
    a silicon substrate having a first surface, which is adjacent to the package substrate, and a second surface, which is opposite to the first surface and adjacent to the semiconductor chips;
    an optical device disposed on a lower portion of the interposer,
    a penetration electrode penetrating the silicon substrate;
    a lower clad layer disposed on the first surface of the silicon substrate;
    an optical waveguide on the lower clad layer;
    an upper clad layer disposed on the optical waveguide to expose a portion of the optical waveguide; and
    a metal pattern on the upper clad layer, wherein the optical device is provided on the expose portion of the optical waveguide.

13. The optical module package of claim 12, wherein the optical device comprises a light source and a photodetector, the optical module package further comprises:
   prisms, which are respectively provided between the light source and the optical waveguide and between the photodetector and the optical waveguide; and
   lenses, which are respectively provided between the light source and the prism and between the photodetector and the prism,
   the lens comprises a material whose refractive index is higher than 1.65, and
   the optical waveguide comprises silicon nitride whose refractive index ranges from 1.45 to 2.0.

14. The optical module package of claim 13, wherein the package substrate comprises an upper portion, in which a recess is formed, and
   a portion of the optical device is disposed in the recess.

15. The optical module package of claim 13, further comprising an upper interconnection layer provided between the semiconductor chips and the second surface of the silicon substrate,
   wherein the upper interconnection layer electrically connect the semiconductor chips to the penetration electrode.

16. An optical module package, comprising:
   a base substrate;
   a package substrate on the base substrate;
   a socket provided between the package substrate and the base substrate to enclose the package substrate;
   a semiconductor chip on the package substrate;
   a heat sink on the semiconductor chip; and
   a metal lid between the heat sink and the semiconductor chip,
   wherein the semiconductor chip comprises:
   an optical waveguide which is disposed in a lower portion of an interconnection layer disposed in a lower portion thereof,
   a first optical module, and a second optical module, which are disposed on the optical waveguide, the first optical module comprises a light source providing light into the optical waveguide, and
   the second optical module comprises a photodetector receiving the light.

* * * * *